United States Patent
Wilkins

(10) Patent No.: US 9,780,865 B2
(45) Date of Patent: Oct. 3, 2017

(54) AIRCRAFT-NODED DATA COMMUNICATION NETWORK

(71) Applicant: The Boeing Company, Chicago, IL (US)

(72) Inventor: Donald F. Wilkins, O'Fallon, MO (US)

(73) Assignee: The Boeing Company, Chicago, IL (US)

(*) Notice: Subject to any disclaimer, the term of this patent is extended or adjusted under 35 U.S.C. 154(b) by 822 days.

(21) Appl. No.: 14/165,320

(22) Filed: Jan. 27, 2014

(65) Prior Publication Data

US 2016/0065300 A1    Mar. 3, 2016

(51) Int. Cl.
*H04B 7/00* (2006.01)
*H04B 7/185* (2006.01)
*G06Q 40/04* (2012.01)

(52) U.S. Cl.
CPC ......... *H04B 7/18508* (2013.01); *G06Q 40/04* (2013.01); *H04B 7/18506* (2013.01)

(58) Field of Classification Search
CPC ............ H04B 7/18506; H04B 7/18508; H04H 60/94; H04H 60/375; H04H 60/45; H04W 52/0216; H04W 88/185; H04W 4/005; H04W 4/02; H04W 88/022
USPC ....... 455/500, 431, 13.1, 11.1, 3.06
See application file for complete search history.

(56) References Cited

U.S. PATENT DOCUMENTS

| 3,030,500 A | 4/1962 | Katzin | |
| 2013/0009823 A1* | 1/2013 | Wang | G01S 13/765 342/464 |
| 2013/0273839 A1* | 10/2013 | Breshears | H04L 45/42 455/11.1 |

FOREIGN PATENT DOCUMENTS

| CA | 2307382 | 12/2000 |
| EP | 2096771 | 9/2009 |
| WO | 0159961 | 8/2001 |
| WO | 2015073687 | 5/2015 |

OTHER PUBLICATIONS

Examination Report for British Patent Application No. GB1501152.1 dated Mar. 1, 2016.
Combined Search and Examination Report for Application No. GB1501152.1 dated Jun. 29, 2015.
Schneider, Financial Trading at the Speed of Light, http://spectrum.ieee.org/computing/it/financial-trading-at-the-speed-of-light, Posted Sep. 23, 2011.

* cited by examiner

*Primary Examiner* — Shaima Q Aminzay
(74) *Attorney, Agent, or Firm* — Kunzler Law Group, PC

(57) ABSTRACT

Defined herein is a system for communicating data includes a first data source that transmits data through the air, and a second data source that is remote from the first data source. The second data source at least one of receives and transmits data through the air. The system further includes at least one aircraft that receives data through the air from the first and second data sources, and transmits data through the air to at least one of the first and second data sources.

14 Claims, 6 Drawing Sheets

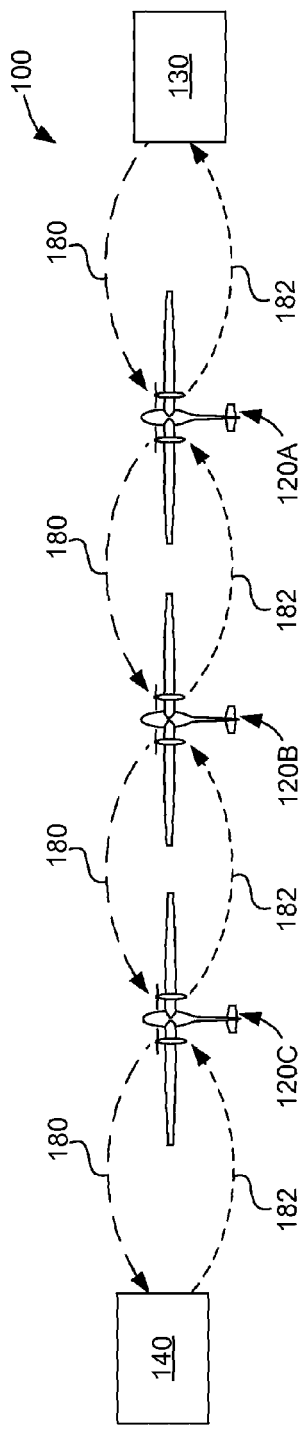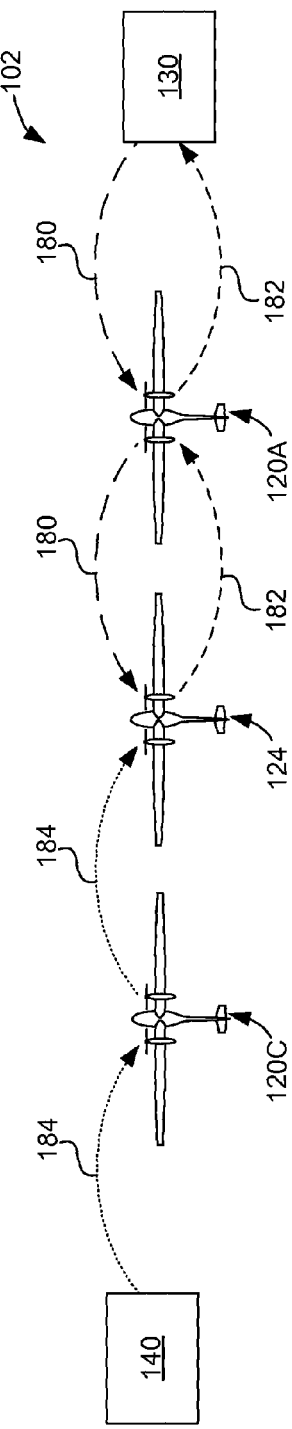

AIRCRAFT-NODED DATA COMMUNICATION NETWORK

FIELD

This disclosure relates generally to data communication networks, and more particularly to reducing latency times in data communication networks.

BACKGROUND

High-speed, high-capacity data communication networks are desirable in a wide variety of industries. Generally, such networks operate to transmit large amounts of electronic data from one location to another location at a relatively high rate of speed. For some applications, the bandwidth or capacity (e.g., data transfer rate) of the data communication network may be more desirable than the speed of the network. In other applications, however, the latency or speed of the data communication network (e.g., the time it takes data to be transmitted between a source and a destination within the network) may be more important than the capacity. Networks with a low latency may improve both the efficiency and profitability of a given application for which the network is being used.

The latency of a data communication network can be affected by the capacity and physical characteristics of the network. Although saturated usage of a network with a relatively low capacity may cause congestion, which can lead to increased latency, in many situations, latency is more closely aligned with the inherent limitations of the electrical characteristics of the physical circuit defining the network. Data or energy pulses travel at different speeds in different mediums. Accordingly, a data communication network that transmits data using one type of medium (e.g., air) may have a lower latency, or higher speed, than a data communication network that uses another type of medium (e.g., metal). Recently, to decrease latency, some data communication networks have employed high-speed mediums to increase data transfer speeds and reduce latency. For example, many conventional data communication networks use fiber-optic cables, free-space radio waves (e.g., microwaves), and free-space optical technologies (e.g., laser links) to transmit data.

High-frequency trading (HFT) is one industry that relies on high-speed data communication networks. HFT is the automated, algorithmic, and rapid buying and selling of securities, such as stocks. According to some strategies, HFT includes monitoring disparate (e.g., geographically separated) financial markets for securities that can be bought low in one market and sold high in another market. Because changes in price of a security in one market are usually quickly reflected in other market, the buying and selling of securities must be performed rapidly for HFT to be successful. Accordingly, HFT providers rely heavily on the processing speed of the trades, which is dependent on the latency and speed of the data communication network being employed. For this reason, many HFT providers use data communication networks that utilize low-latency mediums, such as air, to execute the HFT process.

SUMMARY

The subject matter of the present application has been developed in response to the present state of the art, and in particular, in response to the shortcomings of high-speed data communication networks for use with various applications, such as high-frequency trading (HFT), that have not yet been fully solved by currently available networks. Long-distance fiber-optic cables, while increasing the speed of data communication networks over conventional metal cables, such as coaxial cables, do not provide the necessary speeds to optimize the efficiency and profitability of certain applications, such as HFT. Further, although some data communication networks using free-space techniques transmit data at higher speeds than data communication networks that rely on long-distance cables, thus improving the efficiency and profitability of a given application, such data communication networks still suffer from several shortcomings.

Free-space data communication networks use on-ground nodes between which data is transmitted through the air using free-space communication signals, such as radio waves or laser signals. Because free-space communication signals propagate through the air, they require line-of-site between the source or origin of the signals and the destination for complete transmission between the source and destination. Various large obstacles, such as terrain, geographical formations, curvature of the earth, etc., can limit the range of free-space data communication networks and ability to transmit data. Some HFT service providers have removed large obstacles. Other HFT service providers add excessive quantities of on-ground nodes to the system in order to go around or over obstacles. These previous techniques to overcome the shortcomings of free-space communication signals added excessive and burdening time and cost to the implementation of the corresponding data communication networks. Some obstacles, such as the curvature of the earth, cannot be remedied with conventional data communication techniques.

The subject matter of the present application has been developed to provide an apparatus, system, and method that overcome at least some of the above-discussed shortcomings of prior art data communication techniques. More particularly, described herein is a data communication system that removes the negative impact of all or most of the obstacles associated with free-space communication techniques. In certain implementations, a data communication system uses aircraft as data transmission nodes for transmitting data through the air above the ground to provide high speed transmission of data without line-of-site obstacles associated with conventional open-space networks.

According to one embodiment, a system for communicating data includes a first data source that transmits data through the air, and a second data source that is remote from the first data source. The second data source at least one of receives and transmits data through the air. The system further includes at least one aircraft that receives data through the air from the first and second data sources, and transmits data through the air to at least one of the first and second data sources.

In some implementations of the system, at least one of the first and second data sources is located on the ground. In one implementation, both of the first and second data sources are located on the ground.

According to certain implementations of the system, at least one of the first and second data sources is or forms part of an aircraft. In one implementation, both the first and second data sources are or form part of an aircraft. In some implementations, the at least one aircraft is an unmanned aerial vehicle.

In certain implementations of the system, the at least one aircraft transmits data received from the first data source to the second data source. The second data source can include a processing module that processes the data received from the at least one aircraft to generate response data. The second data source also transmits the response data through the air to the at least one aircraft. The at least one aircraft may transmit the response data through the air to the first data source. In some implementations, the processing module generates the response data by comparing the data received from the at least one aircraft to data stored at the second data source.

According to some implementations, the first data source transmits first data through the air to the aircraft and the second data source transmits second data through the air to the aircraft. The aircraft can include a processing module that generates response data based on a comparison between the first and second data. The aircraft transmits the response data through the air to the first data source.

In certain implementations, the at least one aircraft includes a plurality of aircraft. The at least one aircraft can include a first aircraft and a second aircraft. The first aircraft may receive data through the air directly from the first data source and transmit the data through the air to the second aircraft. The second aircraft may receive the data through the air from the first aircraft and transmit the data through the air directly to the second data source. The at least one aircraft can further include a third aircraft that receives the data through the air directly from the first aircraft and transmits the data through the air directly to the second aircraft.

In some implementations, the system further includes a ground node located on the ground. The at least one aircraft includes a first and a second aircraft. The first aircraft receives the data through the air from the first data source and transmits the data through the air to the ground node. The ground node transmits the data through the air to the second aircraft. The second aircraft transmits the data through the air to the second data source. The first data source can transmit first data through the air to the first aircraft, and the first aircraft can transmit the first data through the air to the ground node. The second data source can transmit second data through the air to the second aircraft, and the second aircraft can transmit the second data through the air to the ground node. The ground node can include a processing module that generates response data based on a comparison between the first and second data. The ground node transmits the response data through the air to the first aircraft and the first aircraft transmits the response data through the air to the first data source.

According to certain implementations, the first data source includes a first securities exchange located in a first geographical location and the second data source includes a second securities exchange located in a second geographical location remote from the first geographical location. In one implementation, the data transmitted through the air from the first securities exchange to the at least one aircraft can include first stock price data generated at the first securities exchange. The second securities exchange can receive the first stock price data through the air from the at least one aircraft. The second securities exchange may transmit stock execution order data through the air to the at least one aircraft, and the at least one aircraft transmits the stock execution order data through the air to the first securities exchange. The stock execution order data being based on a comparison between the first stock price data and second stock price data generated at the second securities exchange. In another implementation, second stock price data generated at the second securities exchange is transmitted through the air to the at least one aircraft, where the at least one aircraft generates stock execution order data based on a comparison between the first stock price data and second stock price information.

In another embodiment, a method for rapid communication of data includes transmitting first data from a first source through the air to at least one aircraft in flight. The method also includes processing the first data to generate response data based on second data from a second source remote from the first source. Additionally, the method includes transmitting the response data from the at least one aircraft in flight through the air to the first source.

According to some implementations, the method also includes transmitting the first data from the at least one aircraft in flight through the air to the second source. The second source processes the first data to generate the response data and transmits the response data through the air to the at least one aircraft in flight.

In yet some implementations, the method further includes transmitting the second data from the second source through the air to the at least one aircraft in flight. The at least one aircraft in flight processes the first data to generate the response data.

According to certain implementations of the method, the first data is transmitted from the first source through the air to a first aircraft in flight, and the response data is transmitted from the first aircraft in flight through the air to the first source. The method can further include transmitting the first data from the first aircraft in flight to a ground node, and transmitting the first data from the ground node through the air to a second aircraft in flight. Additionally, the method can include transmitting the first data from the second aircraft in flight through the air to the second source, where the second source processes the first data to generate the response data. The method may also include transmitting the response data from the second source through the air to the second aircraft in flight. Further, the method can include transmitting the response data from the second aircraft in flight through the air to the ground node, and transmitting the response data from the ground node to the first aircraft in flight.

In certain implementations, the method can further include transmitting the first data from the first aircraft in flight to a ground node, transmitting the second data from the second source through the air to a second aircraft in flight, and transmitting the second data from the second aircraft in flight through the air to the ground node. The ground node processes the first data to generate the response data. The method also includes transmitting the response data from the ground node to the first aircraft in flight.

According to some implementations of the method, the first data is transmitted from the first source through the air to a first aircraft in flight, and the response data is transmitted from the first aircraft in flight through the air to the first source, and the first data is transmitted from the first aircraft in flight through the air to a second aircraft in flight.

In yet some implementations of the method, the first data is transmitted from the first source through the air to a first aircraft in flight, the response data is transmitted from the first aircraft in flight through the air to the first source, and the response data is transmitted from a second aircraft in flight through the air to the first aircraft in flight.

According to another embodiment, a method for high-frequency trading includes transmitting stock price information from a first market through the air to an aircraft. The method also includes generating a securities execution order based on a comparison between the stock price information from the first market and stock price information from a second market remote from the first market. Additionally, the method includes transmitting the securities execution order through the air from the aircraft to the first market. The method further includes executing the securities execution order at the first market.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which:

FIG. 3 is a schematic flow diagram of a data communication system according to one embodiment;

FIG. 4 is a schematic flow diagram of a data communication system according to another embodiment;

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
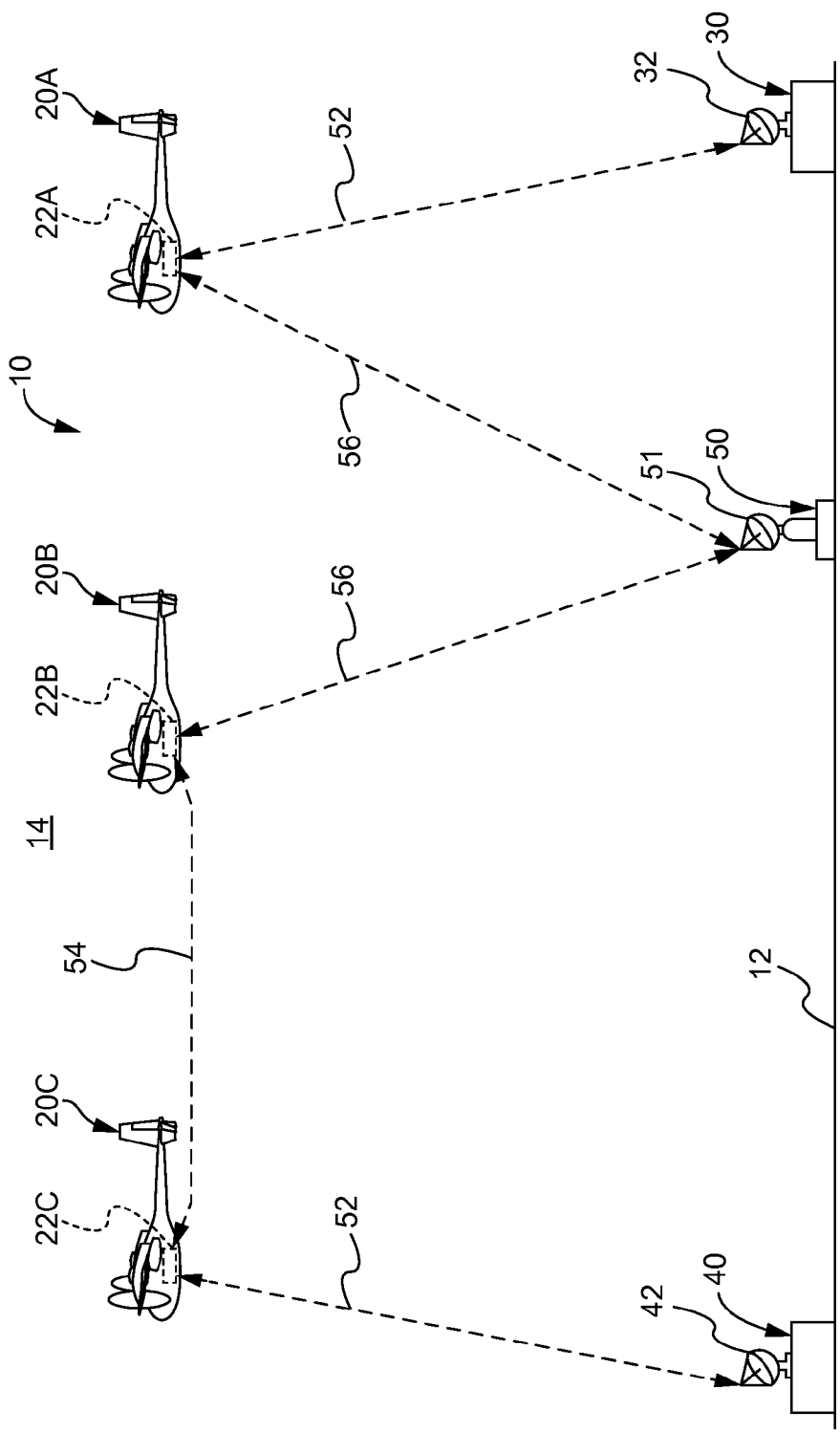
FIG. 1 is a schematic view of a data communication system according to one embodiment.

Referring to FIG. 1, one embodiment of a data communication system 10 is shown. The data communication system 10 includes a first data source 30 and a second data source 40 both positioned on the ground 12. The first data source 30 is geographically remote or distanced from the second data source 40. Each data source 30, 40 includes data stored permanently or temporarily in memory or other data storage devices. The data can be any of various types of data regarding any of various types of information.

In one particular embodiment, the first data source 30 is or forms part of a first securities exchange or market and the second data source 40 is or forms part of a second securities exchange or market. A securities exchange is a marketplace in which securities, commodities, derivatives, and/or other financial instruments are traded. The securities exchange functions to ensure fair and orderly trading, including dissemination of price information for financial instruments and providing a platform for buying and selling such financial instruments. According to a particular implementation, the first data source 30 corresponds with the New York Stock Exchange, and the second data source 40 corresponds with the Chicago Stock Exchange. In other implementations, the first data source 30 corresponds with any securities exchange throughout the world, and the second data source 40 corresponds with any other securities exchange throughout the world.

The first securities exchange associated with the first data source 30 operates independently from the second securities exchange associated with the second data source 40. In other words, although the first and second securities exchanges may trade the same financial instruments, the exchanges facilitate trading (e.g., buying and selling) of the financial instruments independently of each other. For example, a particular company may offer stocks for trading on both the first and second securities exchanges, but the price for such stocks and the mechanisms for buying and selling the stocks on the first and second securities exchanges are separate. Notwithstanding the operational interdependence between first and second securities exchanges, trading trends and pricing of a financial instruments on one exchange are typically closely aligned with the trading trends and pricing of the corresponding financial instruments on the other exchange. However, while being closely aligned, financial instrument price and trading patterns on one exchange may briefly lag in time with the other exchange. So-called high frequency trading (HFT), as described above, is designed to benefit from the potential lag between the prices of financial instruments on disparate securities exchanges.

Each of the first and second data sources 30, 40 is configured to transmit and/or receive data communication signals through the air 14. In one implementation, the first data source 30 includes at least one data communication signal transceiver 32 that transmits and receives first data communication signals 52. In certain implementations, the first data source 30 can include separate data communication signal transmitter and receiver devices instead of a transceiver 32. The second data source 40 may also include a transceiver 42 (or separate transmitter and receiver) that transmits and receives first data communication signals 52. In yet some implementations, as will be described in more detail below, the second data source 40 is configured to only transmit first data communication signals 52. In other words, in such implementations, the second data source 40 does not receive first data communication signals 52. The first data communication signals 52 can be defined as data communication signals transmitted between an on-ground data source and an aircraft in flight.

The data communication system 10 also includes at least one aircraft. Although the data communication system 10 can include any number of aircraft, in the illustrated embodiment of FIG. 1, the data communication system 10 includes three aircraft: a first aircraft 20A, a second aircraft 20B, and a third aircraft 20C. Each aircraft 20A-C can be one of various types of non-orbiting aircraft, such as airplanes, drones, and helicopters. The aircraft of the data communication system 10 can be the same type of aircraft or different types of aircraft. In some implementations, each aircraft 20A-C is an unmanned (e.g., pilotless) aircraft or unmanned aerial vehicle (UAV). The unmanned aerial vehicle can be a high-altitude, long-endurance (HALE) aircraft configured to fly at substantial heights and remain in flight for extended periods of time. According to some implementations, a UAV of the data communication system 10 may fly at altitudes between about 60,000 feet and about 130,000 feet, and remain in flight without landing for days, weeks, and months. Such UAVs may be powered via solar power, or other self-sustaining energy sources. In one implementation, one or more of the aircraft 20A-20C of the data communication system 10 may be a "Phantom Eye" HALE UAV, manufactured by Boeing® of Chicago, Ill.

The aircraft 20A-C each includes a control module 22A-C, respectively. Each control module 22A-C is configured to control the receipt and transmission of data communication signals through the air. In some implementations, the aircraft of the data communication system 10 receives second data communication signals 54 from and transmits second data communication signals 54 to other aircraft. For example, second data communication signals 54 are transmitted between the second and third aircraft 20B, 20C. The second data communication signals 54 can be defined as data communication signals transmitted between aircraft in flight. The aircraft 20A-C each includes a transceiver (or separate transmitter and receiver) for transmitting and receiving data communication signals. The transceiver (or separate transmitter and receiver) of each aircraft can be communicatively and controllably coupled to the control module of the corresponding aircraft. Each aircraft 20A-C can be equipped with a large and complex avionics suite that may include processors capable of executing complex algorithms and databases sufficiently large and advanced to store and organize data used by the algorithms.

Figure 2:
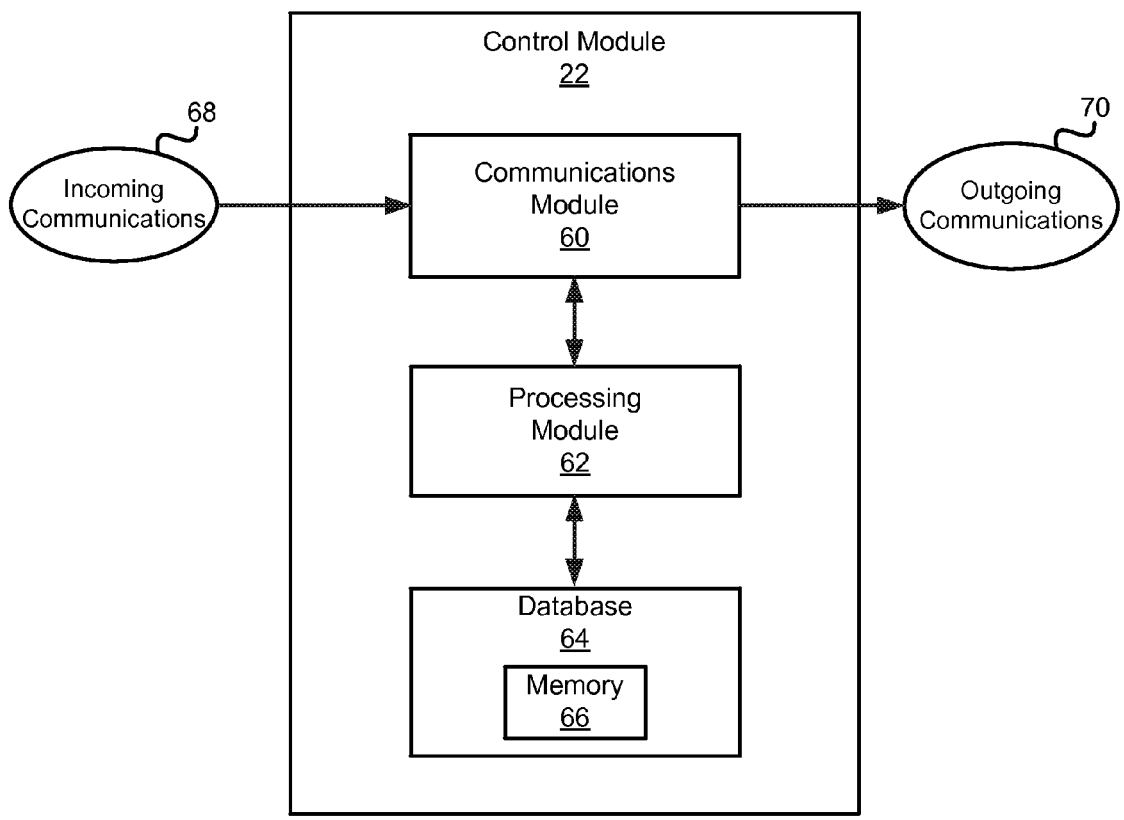
FIG. 2 is a schematic view of a control module of a data communication system according to one embodiment.

Referring to FIG. 2, in one embodiment, the control modules 22A-C of each aircraft 20A-C can be represented by a control module 22. The control module 22 includes a communications module 60, a processing module 62, and a database 64 having a memory 66. The communications module 60 is configured to receive and interpret incoming communications 68, and generate and transmit outgoing communications 70. The incoming and outgoing communications 68, 70 can be free-space data communication signals, such as signals 52, 54, 56. Alternatively, in some embodiments, such as when the control module 22 forms part of the first and/or second data sources 30, 40, the incoming and/or outgoing communications 68, 70 can be other types of data communication signals transmitted over wired communication links. In some embodiments, the control module 22 includes only the communications module 60. In such embodiments, the control module 22 functions merely as a repeater or passthrough device to transmit the same data out of the control module as received into the control module.

The processing module 62 is configured to process the data transmitted via the incoming communications 68. The incoming data can be processed or analyzed for any of various reasons using any of various processing or analysis techniques. In some embodiments, the processing module 62 includes one or more processors configured to execute an algorithm relying on the incoming data as input. The processing module 62 may also rely on other data as input, such as data from the database 64, which will be described in more detail below. The processing module 62 executes the algorithm and generates output data that the communications module 60 can convert into outgoing communications 70.

The database 64 is configured to store and organize data. The data can be stored in the memory 66. Furthermore, the data can be any of various data received from any of various sources. For example, the data can be raw or source data received from a data source, such as the first and second data sources 30, 40. Alternatively, the data can be processed data, such as data received from the processing module 62.

In some implementations, the data communication system 10 may additionally include at least one ground node 50 positioned on the ground 12. The ground node 50 is configured to transmit and receive data communication signals through the air. In one implementation, the ground node 50 includes at least one data communication signal transceiver 51 (or separate transmitter and receiver) that transmits and receives third data communication signals 56. The third data communication signals 56 can be defined as data communication signals transmitted between a ground node 50 and an aircraft in flight. The ground node 50, as well as the first and/or second data sources 30, 40, may also include a control module with features analogous to the control modules of the aircraft 20A-C. Although the data communication system 10 of the illustrated embodiment includes a ground node 50, in other embodiments, the system includes no ground nodes such that all data communication between the first and second data sources 30, 40 is performed via aircraft in flight. The ground node 50 can be fixed or movable relative to the ground. Furthermore, the ground 12 can be land or water. Accordingly, in one implementation, the ground node 50 is or forms part of a boat. In the same manner that the ground node 50 acts as a node of the network embodied by the system 10, the aircraft can be considered or defined as nodes of the network located in the air.

The first, second, and third data communication signals 52, 54, 56 can be any of various types of data communication signals capable of transmission through air. In some implementations, the data communication signals 52, 54, 56 are free-space radio waves, such as microwaves. In yet some implementations, the data communication signals 52, 54, 56 are free-space optical signals, such as laser links. The free-space data communication signals 52, 54, 56 can be generated, transmitted, received, and interpreted according to conventional methods known in the art. For example, the signals 52, 54, 56 may communicate data using any of various network protocols known in the art, such as TCP/IP, FTP, HTTP, PPP, SFTP, and the like.

In a general embodiment, the data communication system 10 facilitates the rapid transmission of source data from the first data source 30 to the second data source 40. Source data generated by and/or stored at the first data source 30 is transmitted through the air 14 to the first aircraft 20A via a free-space data communication signal 52. The first aircraft 20A receives the data communication signal 52 and, in the illustrated implementation, transmits the source data through the air 14 directly to the ground node 50 via a free-space data communication signal 56. The ground node 50 then transmits the source data through the air 14 to the second aircraft 20B via a free-space data communication signal 56. In another implementation, such as when the system 10 does not include a ground node 50 or when bypassing the ground node is desirable, the first aircraft 20A transmits the source data through the air 14 directly to the second aircraft 20B via a free-space data communication signal 54. The second aircraft 20B transmits the source data through the air to the third aircraft 20C via a free-space data communication signal 54. Then, the third aircraft 20C transmits the source data through the air to the second data source 40 via a free-space communication signal 52.

It is recognized that in some implementations, the data communication system 10 may include fewer or more than three aircraft. For example, in one implementation, the data communication system 10 includes a single, such as the first aircraft 20A, that transmits the source data from the first data source 30 through the air directly to the second data source 40 via a free-space data communication signal 56. Alternatively, in another implementation, the data communication system 10 includes only two aircraft, such as the first and second aircraft 20A, 20B, and source data from the first data source 30 is transmitted through the air from the first aircraft directly to the second aircraft and from the second aircraft directly to the second data source 40.

In the illustrated embodiment of FIG. 1, once received, the second data source 40 processes the source data originating from the first data source and generates response data. In one implementation, the second data source 40 processes the source data by executing an algorithm that utilizes the source data as input and generates the response data as output. In this manner, the response data is based on or depends from the source data. The algorithm may utilize other source data as input, such as source data generated by and/or stored at the second data source 40. Accordingly, in some implementations, the second data source 40 is configured to generate response data based on or depending from source data form the first data source 30 and source data from the second data source 40. Where the first and second data sources 30, 40 are first and second securities exchanges, respectively, the source data from the first data source can be price information of a financial instrument at the first securities exchange, and the source data from the second data source can be price information of the financial instrument at the second securities exchange. The response data can be an execution order to buy or sell the financial instrument at the first securities exchange, which is determined based on a comparison between the price information of the financial instrument at the first and second securities exchanges.

The response data generated by the second data source 40 is rapidly transmitted from the second data source to the first data source 30 via the data communication system 10. For example, in the illustrated embodiment, the response data is transmitted through the air 14 from the second data source 40 to the third aircraft 20C via a data communication signal 52, from the third aircraft to the second aircraft 20B, from the second aircraft to the ground node 50 via a data communication signal 56, from the ground node 50 to the first aircraft 20A via a data communication signal 56, and from the first aircraft to the first data source 30 via a data communication signal 52. Of course, as described above, in other embodiments, the response data can be transmitted through the air 14 from the second data source 40 to the first data source 30 via only aircraft in flight (e.g., without using a ground node). Further, in certain embodiments, the response data can be transmitted between fewer or more than three aircraft to reach the first data source 30. After the response data is received at the first data source 30, the first data source 30 is configured to process the response data and execute or not execute an action based on the response data. For example, if the response data is an execution order to buy a financial instrument at the first securities exchange, then the first data source 30 buys the financial instrument at the first securities exchange in response to the response data.

Referring to FIGS. 3-6, several respective embodiments of a data communication system are shown schematically. The data communication systems of FIGS. 3-6 include some features similar to the features of the data communication system 10 of FIG. 1, with like numbers referring to like features. Therefore, the description of features of the system 10 can be applied to analogous features of the systems of FIGS. 3-6. Each system includes and is configured to transmit data between first and second data sources 130, 140 via free-space data communication signals. Accordingly, unless otherwise noted, the communications or transmissions of data between the described elements of the systems are effectuated by free-space data communication signals transmitted through the air. The systems utilize aircraft to facilitate a high-speed transmission of data conducive to certain industries, such as HFT, and provide data processing functionality. However, each system transmits the data and/or processes the data differently.

The data communication system 100 of FIG. 3 transmits first source data 180 from the first data source 130 to the second data source 140 via multiple aircraft, such as the first, second, and third aircraft 120A-C. The second data source 140 processes the first source data and generates response data 182. In certain implementations, the second data source 140 may rely on second source data obtained or generated by the second data source as input for generating the response data 182. For example, the response data 182 may be based on a comparison between the first source data 180 and the second source data. The response data 182 is transmitted from the second data source 140 to the first data source 130 via the same, or different, aircraft used to transmit the first source data 180. The first data source 130 then processes the response data. In one implementation, the first source data 180 includes first stock price data in a first stock exchange at the first data source 130, and the response data 182 includes stock execution order data or an order to execute a buy or sell of a first stock. The second source data is used by the second data source 140 to generate the stock execution order data in some implementations, with the second source data including second stock price data in a second stock exchange at the second data source. The first and second stock price data are associated with the price of the same stock in the first and second stock exchanges, respectively.

In another embodiment, the data communication system 102 of FIG. 4 is similar to the data communication system 100 of FIG. 3. For example, the data communication system 102 transmits first source data 180 from the first data source 130 to multiple aircraft, such as the first aircraft 120A and a second aircraft 124, and the same, or different, aircraft transmit response data 182 to the first data source 130. However, instead of the second data source 140 processing the first source data 180 to generate the response data 182 as with the data communication system 100, in the data communication system 102, an aircraft (e.g., the second aircraft 124) is equipped to process the first source data 180 to generate the response data. Moreover, the aircraft generates the response data 182 based on a comparison between the first source data 180 and second source data 184, which is received via a free-space data communication signal from the second data source 140. In one implementation, the first source data 180 includes first stock price data in a first stock exchange at the first data source 130, the second source data 184 includes second stock price data in a second stock exchange at the second data source 140, and the response data 182 includes stock execution order data or an order to execute a buy or sell of a first stock.

Figure 5:
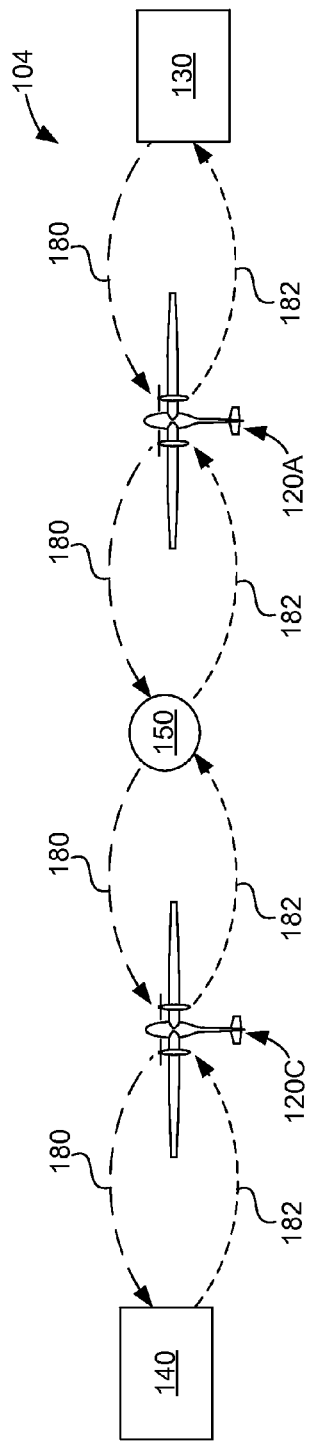
FIG. 5 is a schematic flow diagram of a data communication system according to yet another embodiment.

In yet another embodiment, the data communication system 104 of FIG. 5 is similar to the data communication system 100 of FIG. 3, except that a ground node 150 has effectively replaced the second aircraft 120B. Accordingly, the data communication system 104 transmits first source data 180 from the first data source 130 to the ground node 150 via an aircraft, such as the first aircraft 120A, and the ground node transmits the first source data 180 to the second data source 140 via another aircraft, such as the third aircraft 120C. The second data source 140 processes the first source data 180 and generates response data 182 in a similar manner as described above. The response data 182 is then transmitted from the second data source 140 to the first data source 130 via the same, or different, aircraft and ground node combination used to transmit the first source data 180.

Figure 6:
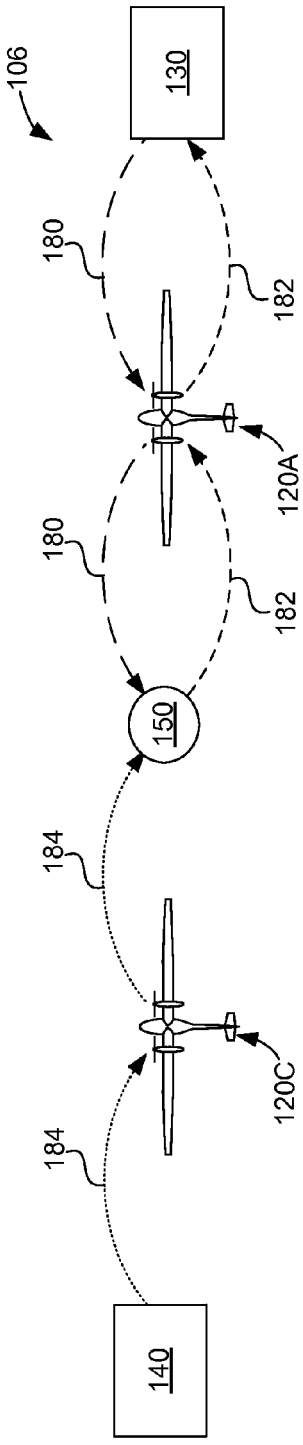
FIG. 6 is a schematic flow diagram of a data communication system according to one embodiment.

According to another embodiment, the data communication system 106 of FIG. 6 is similar to the data communication system 102 of FIG. 4, except that a ground node 150 has effectively replaced the second aircraft 124. Accordingly, the data communication system 104 transmits first source data 180 from the first data source 130 to the ground node 150 via an aircraft, such as the first aircraft 120A. Then, instead of an aircraft, the ground node is equipped to process the first source data 180 to generate the response data 182. The ground node 150 can generate the response data 182 based on a comparison between the first source data 180 and second source data 184 received from the second data source 140.

Although the embodiments of the data communication systems of FIGS. 3-6 are shown and have been described as having a specific number of aircraft and ground nodes, it is recognized that the data communication systems can have any number of aircraft and ground nodes as desired to facilitate rapid transmission and processing of data.

Figure 7:
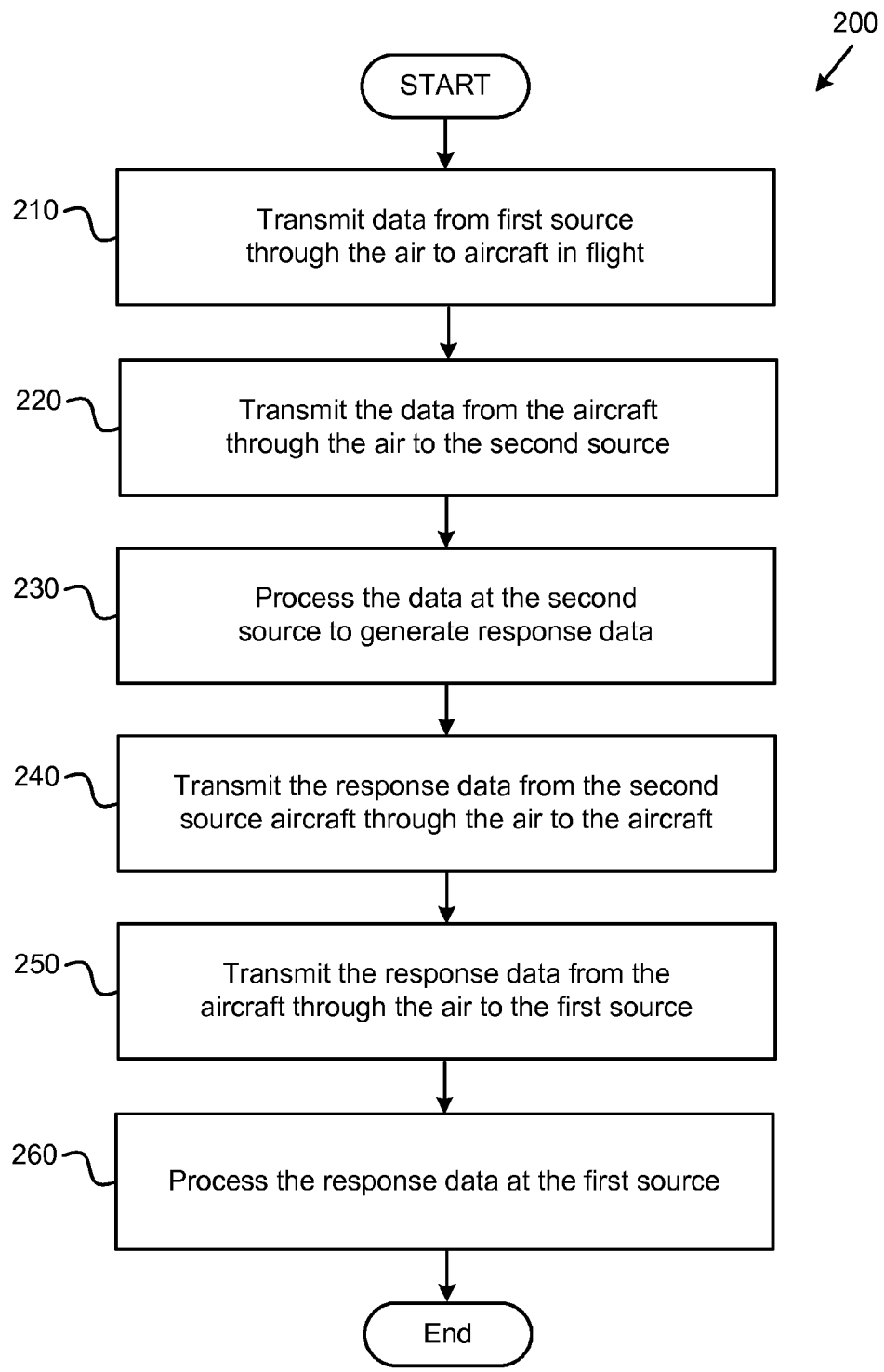
FIG. 7 is a schematic flow diagram of a method for communicating data according to one embodiment.

Referring to FIG. 7, one embodiment of a method 200 for communicating data includes transmitting data from a first source through the air to aircraft in flight at 210. The method 200 also includes transmitting the data from the aircraft through the air to a second source at 220. Additionally, the method 200 includes processing the data at the second source to generate response data at 230, and transmitting the response data from the second source through the air to the aircraft at 240. Processing the data at the second source at 230 may include comparing the data from the first source to data from the second source. The method 200 can also include transmitting the response data from the aircraft through the air to the first source at 250, and processing the response data at the first source at 260. In some implementations, instead of processing the data at the second source, the method 200 may process the data at an aircraft at 230 and omit the action of transmitting the response data from the second source at 240. In such implementations, processing the data at the aircraft at 230 may include comparing data from the first source to data transmitted by and received from the second source. In certain implementations, instead of an aircraft processing the data at 230, the method 200 processes the data at a ground node that receives the data from an aircraft.

Figure 8:
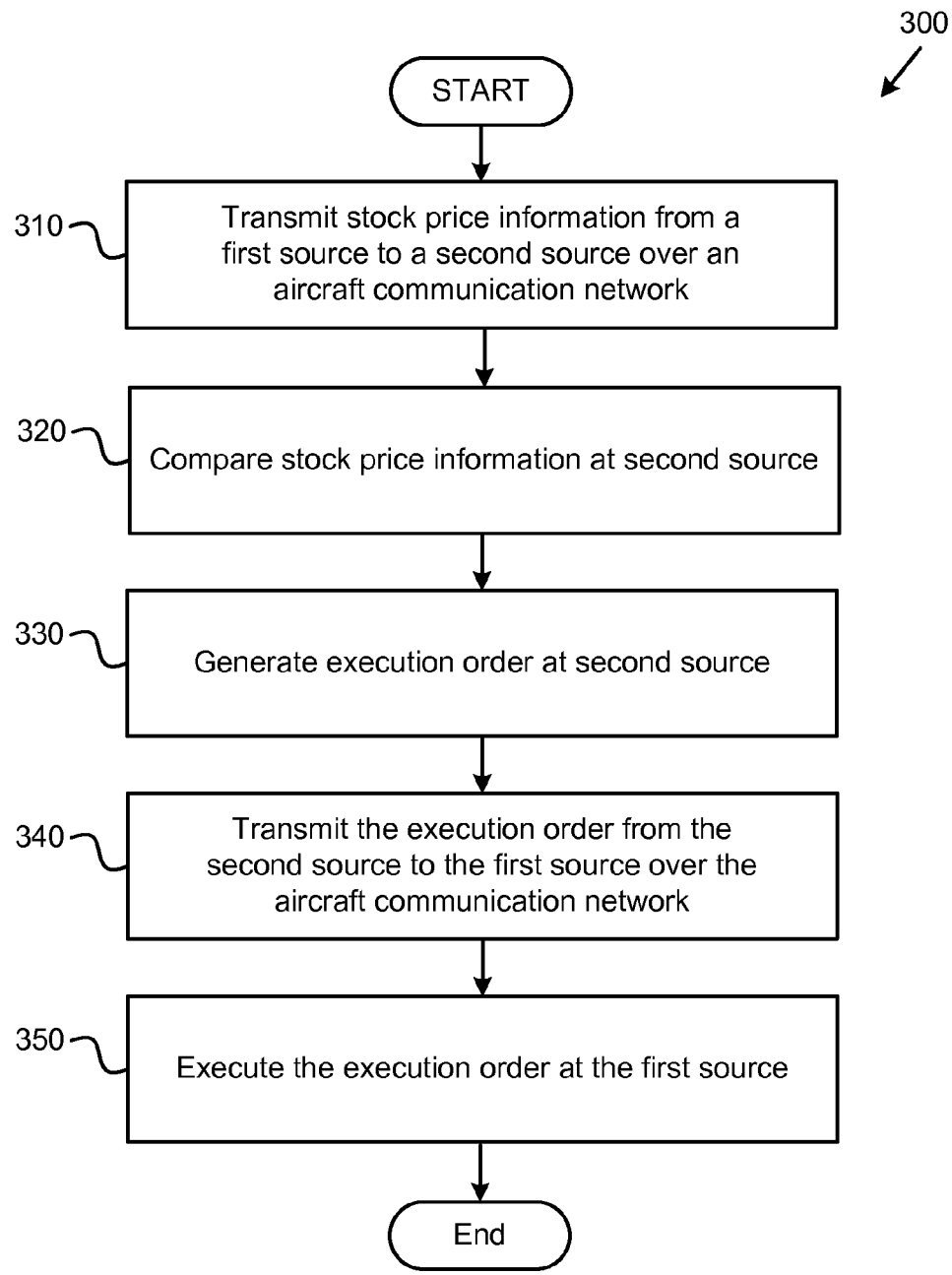
FIG. 8 is a schematic flow diagram of a method for high-frequency trading according to one embodiment.

Referring to FIG. 8, an embodiment of a method 300 for high-frequency trading includes transmitting stock price information from a first source (e.g., first stock market) to a second source (e.g., second stock market) over an aircraft communication network at 310. The method 300 further includes comparing stock price information at the second source at 320 and generating an execution order at the second source at 330. Comparing the stock price information at 320 may include comparing stock price information from the first source to stock price information from the second source. The execution order can include an order to buy, sell, or hold a stock or other financial instrument. The method 300 then transmits the execution order from the second source to the first source over the aircraft communication network at 340. Additionally, the method 300 executes the execution order at the first source at 350.

In certain implementations of the method 300, the stock price information is transmitted from the first source to an aircraft or ground node of the aircraft communication network. Additionally, in some implementations, the stock price information is not transmitted to the second source. Rather, the method 300 includes transmitting stock price information from the second source to the aircraft or ground node, which compares the stock price information received from the first and second sources at 320. The aircraft or ground node then generates the execution order at 330, instead of the second source, and the execution order is transmitted from the aircraft or ground node to the first source.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive.

All changes which come within the meaning and range of equivalency of the claims are to be embraced within their scope.

What is claimed is:

1. A system for communicating data, comprising:
a first data source configured to generate first data at a first time and transmit the first data through the air;
a second data source geographically remote from the first data source, the second data source being configured to receive the first data, generate second data at the first time, and transmit the second data through the air, wherein the second data source is further configured to update the second data at a second time, after the first time, in response to receiving the first data from the first data source;
a first aircraft that receives the first data through the air from the first data source and receives the second data through the air from the second data source, and transmits response data through the air to the second data source to execute an operation at the second data source; and
a ground node located at a ground site geographically remote from the first data source and the second data source;
wherein:
the first aircraft transmits the first data and the second data through the air to the ground node;
the ground node comprises a processing module that generates the response data based on a comparison of the first data and the second data associated with the first time, the ground node transmitting the response data through the air to the first aircraft; and
the second data source executes the operation at a third time, wherein the third time is after the first time and before the second time.

2. The system of claim 1, wherein at least one of the first data source and the second data source is located at a ground site.

3. The system of claim 2, wherein both of the first data source and the second data source are located at geographically remote ground sites.

4. The system of claim 1, wherein at least one of the first data source and the second data source is an aircraft.

5. The system of claim 4, wherein both of the first data source and the second data source are aircraft.

6. The system of claim 1, further comprising a second aircraft, wherein the second data source transmits the second data through the air to the first aircraft via the second aircraft.

7. The system of claim 1, wherein the first aircraft transmits at least one of the first data and the second data through the air to the ground node via a second aircraft.

8. The system of claim 1, wherein the first aircraft comprises an unmanned aerial vehicle operating above 60,000 feet in altitude.

9. A method for rapid communication of data, comprising:
transmitting first data from a first source through the air to a first aircraft in flight, the first data being associated with a first time;
processing the first data to generate response data based on a comparison of the first data to second data associated with the first time, the second data being from a second source remote from the first source, the second data being updated at a second time at the second source;
transmitting the response data from the first aircraft in flight through the air to the first source, wherein the first source receives and executes an operation based on the response data at a third time, wherein the third time is after the first time and before the second time;
transmitting the first data from the first aircraft in flight to a ground node;
transmitting the first data from the ground node through the air to a second aircraft in flight;
transmitting the first data from the second aircraft in flight through the air to the second source, the second source processing the first data to generate the response data;
transmitting the response data from the second source through the air to the second aircraft in flight;
transmitting the response data from the second aircraft in flight through the air to the ground node; and
transmitting the response data from the ground node to the first aircraft in flight.

10. A method for rapid communication of data, comprising:
transmitting first data from a first source through the air to a first aircraft in flight, the first data being associated with a first time;
processing the first data to generate response data based on a comparison of the first data and second data associated with the first time, the second data being from a second source, wherein the second source is geographically remote from the first source and updates the second data at a second time;
transmitting the response data from the first aircraft in flight through the air to the first source, the first source executing an operation base on the response data at a third time, wherein the third time is after the first time and before the second time;
transmitting the first data from the first aircraft in flight to a ground node;
transmitting the second data from the second source through the air to a second aircraft in flight;
transmitting the second data from the second aircraft in flight through the air to the ground node; and
transmitting the response data from the ground node to the first aircraft in flight.

11. A system for communicating data, comprising:
a first data source that transmits first data through the air, the first data being associated with a first time;
a second data source that generates second data at the first time, the second data source being geographically remote from the first data source and updating the second data at a second time, the second data source comprising a processing module that processes the first data to generate response data based on a comparison of the first data and the second data associated with the first time; and
at least one aircraft, of a plurality of aircraft, that receives the first data through the air from the first data source, and transmits the first data through the air to the second data source, receives the response data from the second data source, and transmits the response data to the first data source, wherein the first data source executes an operation at a third time based on the response data, wherein the third time is after the first time and before the second time.

12. The system of claim 11, wherein the plurality of aircraft comprises a first aircraft and a second aircraft, the first aircraft receives the first data through the air directly from the first data source and transmits the first data through the air to the second aircraft, and the second aircraft receives the data through the air from the first aircraft and transmits the first data through the air directly to the second data source.

13. The system of claim 11, further comprising a ground node located at a ground site geographically remote from the first data source and the second data source, wherein:
   the plurality of aircraft comprises a first aircraft and a second aircraft;
   the first aircraft receives the first data through the air from the first data source and transmits the first data through the air to the ground node;
   the ground node transmits the first data through the air to the second aircraft; and
   the second aircraft transmits the first data through the air to the second data source.

14. A system for communicating data, comprising:
   a first data source that transmits first data through the air, wherein the first data is associated with a first time;
   a second data source remote from the first data source, the second data source transmits second data through the air, wherein the second data is associated with the first time and is updated by the second data source at a second time; and
   at least one aircraft that receives the first data through the air from the first data source and second data through the air from the second data source, and transmits response data through the air to the first data source;
   wherein:
      the first data source transmits the first data through the air to the at least one aircraft and the second data source transmits the second data through the air to the at least one aircraft; and
      the at least one aircraft comprises a processing module that generates the response data based on a comparison between the first data and the second data, the aircraft transmitting the response data through the air to the first data source, wherein the first data source executes an operation at a third time based on the response data, the third time being after the first time and before the second time.

\* \* \* \* \*

UNITED STATES PATENT AND TRADEMARK OFFICE
CERTIFICATE OF CORRECTION

PATENT NO. : 9,780,865 B2
APPLICATION NO. : 14/165320
DATED : October 3, 2017
INVENTOR(S) : Donald F. Wilkins Page 1 of 1

It is certified that error appears in the above-identified patent and that said Letters Patent is hereby corrected as shown below:

In the Claims

Column 17, Line 5, Claim 13:
"at a gr6ound site" should read "at a ground site"

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*